Figure 1:
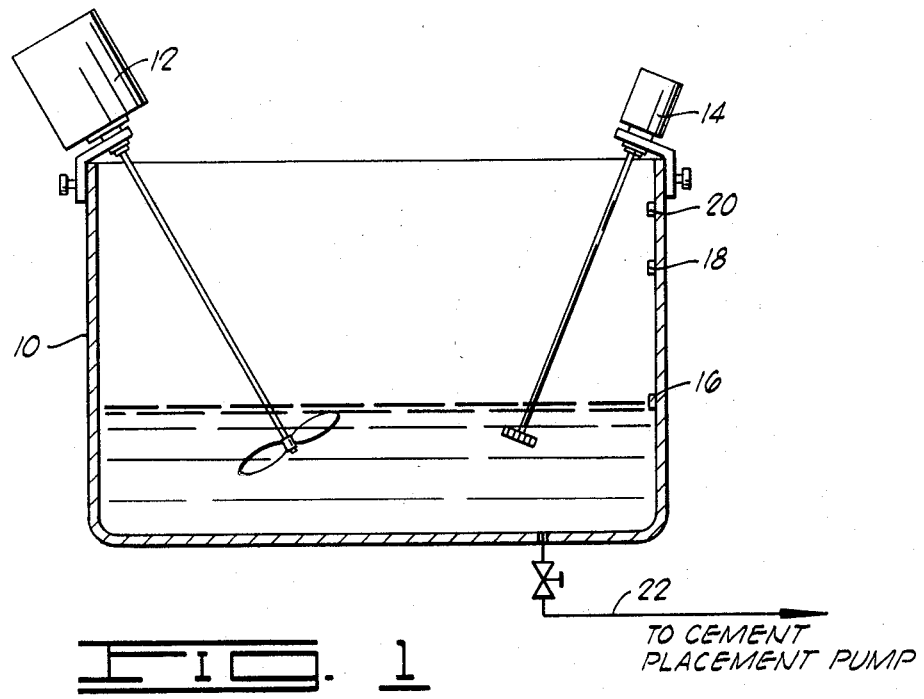

United States Patent [19]

Sutton et al.

[11] 3,844,351

[45] Oct. 29, 1974

[54] METHOD OF PLUGGING A WELL

[75] Inventors: David L. Sutton; Lloyd G. Carter, both of Duncan, Okla.

[73] Assignee: Halliburton Company, Duncan, Okla.

[22] Filed: June 1, 1973

[21] Appl. No.: 365,935

[52] U.S. Cl. .................................................. 166/293
[51] Int. Cl. ............................................. E21b 33/13
[58] Field of Search ...... 166/292, 285, 293; 106/86, 106/87, 88, 91, 92, 122

[56] References Cited
UNITED STATES PATENTS

| | | | |
|---|---|---|---|
| 2,236,987 | 4/1941 | Bechtold | 166/293 |
| 2,695,669 | 11/1954 | Sidwell | 166/292 |
| 2,761,511 | 9/1956 | Billue | 166/292 |
| 2,880,096 | 3/1959 | Hurley | 166/293 |
| 3,036,633 | 5/1962 | Mayhew | 166/293 |
| 3,197,317 | 7/1965 | Patchen | 106/97 X |
| 3,220,863 | 11/1965 | Mayhew | 166/293 X |
| 3,363,689 | 1/1968 | Smith et al | 166/293 X |
| 3,376,146 | 4/1968 | Mitchell | 106/97 |
| 3,669,701 | 6/1972 | Biederman, Jr. | 166/292 X |
| 3,774,683 | 11/1973 | Smith et al | 166/293 |

*Primary Examiner*—Stephen J. Novosad
*Attorney, Agent, or Firm*—Thomas R. Weaver; Fred E. Hook; John H. Tregoning

[57] ABSTRACT

The present invention relates to an improved method of forming a cement plug in a well bore having liquid standing or flowing therein wherein a lightweight cement composition is introduced into the well bore, positioned at or near the surface of the liquid therein and allowed to set into a hard impermeable mass.

22 Claims, 2 Drawing Figures

METHOD OF PLUGGING A WELL

The present invention is directed to an improved method of forming a plug in a well bore, and more particularly, but not by way of limitation, to a method of forming a cement plug in a well bore which traverses one or more low pressure, high permeability water or brine producing formations.

The plugging of well bores drilled into weak formations having high effective permeabilities and low pressures has been difficult. Such formations will accept large volumes of fluids and when a normal weight cement slurry is pumped into the well bore in order to form a plug therein, the hydrostatic head of the fluid in the well bore often exceeds the formation pressure causing the cement slurry to be lost to the formation prior to setting in the well bore. Additionally, water or brine often flows from one zone to another using the well bore as a conduit in which to pass from zone to zone. When a normal weight cement slurry is introduced into the well bore, it is diluted by the flowing water often resulting in a failure to obtain a satisfactory plug. Heretofore, the plugging of such well bores has been accomplished by restricting the loss of the cement slurry to the formation. Generally, this has been done by introducing lost circulation materials into the well bore either prior to introducing the cement slurry therein or contained in the cement slurry, or by placing mechanical plugs or bridging baskets in the well bore prior to placement of the cement slurry. These methods often involve excessive expense or are unreliable due to large volumes of lost circulation material being required and the unpredictable breakdown of the formations sealed by lost circulation material which can result in additional lost circulation material, cement slurry, or both, being required. Further, when mechanical plugs or bridging baskets are used, the expense of the equipment and its placement are incurred with unreliable results often being achieved, particularly in the use of bridging baskets. In the utilization of prior methods, excessive time and service expense and/or the use of excessive quantities of cement slurry are often incurred in order to allow for excessive slurry loss or as a result of repeated attempts due to the failure to obtain a successful plug.

By the present invention a method of forming a plug in a well bore having liquid standing or flowing therein using a lightweight cement composition is provided which is relatively inexpensive to carry out and which obviates the problems attendant heretofore used methods.

Broadly stated, the method of the present invention comprises the steps of preparing a lightweight cement composition having a density substantially equal to or lighter than the density of the liquid in the well bore to be plugged, introducing the lightweight cement composition into the well bore so that the cement composition is positioned at or near the surface of the liquid therein and then allowing the cement composition to set into a hard impermeable mass so that a plug is formed in the well bore.

Figure 2:
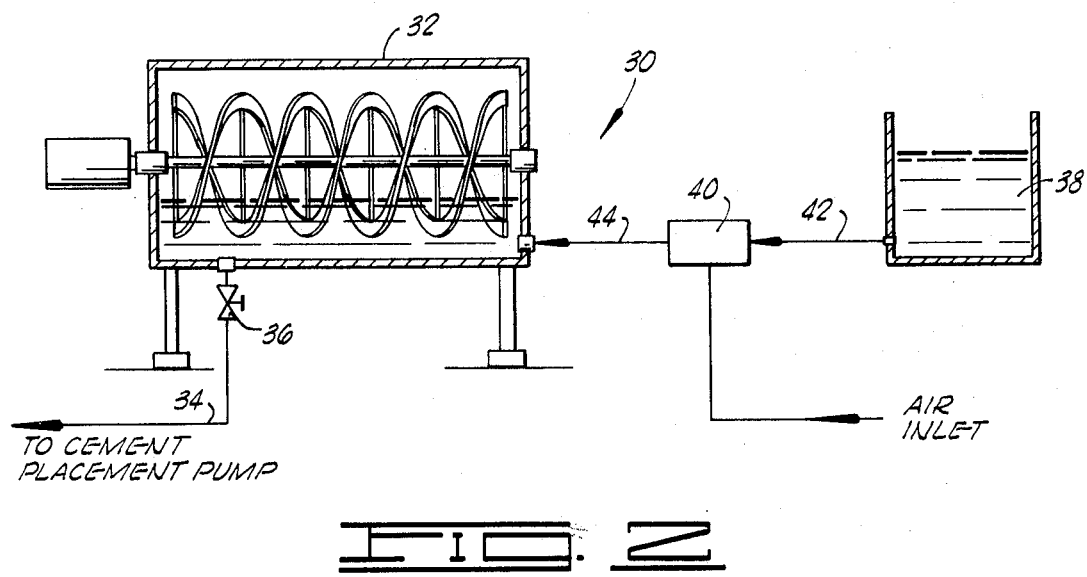

In the drawings forming a part of this disclosure,

FIG. 1 is a partly sectional-partly diagrammatic view of a mixing apparatus which can be utilized for preparing a lightweight cement composition in accordance with the present invention; and FIG. 2 is a partly sectional-partly diagrammatic view of an alternate cement composition mixing system which can be used.

While any of a variety of lightweight cementitious compositions can be used in accordance with the method of the present invention, preferred such compositions are those having a density of not more than about 80 pounds per cubic foot. A particularly suitable such composition is a cellular cement composition formed of a hydraulic inorganic cement, water present in an amount in the range of from about 23 percent to about 80 percent by weight of dry cement, a foam stabilizer present in an amount in the range of from about 0.25 to 5 percent by weight of dry cement and air entrained in said cement composition in an amount sufficient to lower the density thereof to the desired level.

As will be described further hereinbelow, other additives can be used in the lightweight cement composition to impart desired properties thereto. For example, lightweight aggregate such as glass or ceramic cellular spheres, natural or synthetic fibers, metal fibers, fine aggregate, fluid loss control materials, dispersants, set time modifiers, and other materials can be used in the cement composition.

Any of a variety of hydraulic cements such as portland cement, gypsum cement or high alumina cement can be used. Portland cement is generally preferred because of its low cost and good availability.

The water used in the cement composition can be fresh water from any source except that the water should not contain organic compounds or salts which modify the set time of the cement composition or affect the foam stability thereof. Calcium salts such as calcium chloride have been found to adversely affect the stability of most foaming agents used in the cement composition and carbonates cause unpredictable flash setting of the cement composition. However, the water can usually contain other salts such as sodium chloride or potassium chloride in amounts up to about 10 percent by weight without adversely affecting the properties of the cement composition. The particular quantity of water which should be used in the cement composition varies with the quantity and type of foam stabilizers, dispersants and aggregates used. For example, when the cement composition includes an inorganic foam stabilizer which does not affect the consistency of the cement composition to a great degree, a dispersant present in an amount of 1 percent by weight of dry cement or less and no aggregate, a water concentration of about 30 percent by weight of the dry cement is used. When the cement composition includes relatively large quantities of aggregate, no dispersant and a foam stabilizer which changes the consistency of the cement composition, a water concentration of about 70 percent by weight of dry cement is used. Generally, water is present in the cement composition in the range of from about 23 percent to about 80 percent by weight of dry cement used. Water concentrations of less than about 23 percent by weight of cement result in mixing difficulties even where large quantities of dispersants are used, and large quantities of foam stabilizers to entrain the required quantity of air are required. Water concentrations higher than about 80 percent by weight reduce the strength of the set cement due to excessive water being present. A cellular cement composition formed of portland cement, having no dispersants therein, and having water present therein in an amount of about 40 percent by weight of dry cement is preferred for use in carrying out the method of the present invention.

While a variety of foam stabilizers can be used, two types have been found to be particularly suitable for use in accordance with the present invention. These are organic surface active agent foam stabilizers and inorganic particulate lamellar foam stabilizers. Examples of useful organic surfactant foam stabilizers are commercially available alkylnaphthalene sodium sulfonate compounds, ammonium salts of sulfonated linear primary ethoxylated alcohols and dodecyl diphenyl-ether disulfonic acid. Other useful commercially available organic surfactant foam stabilizers are those having the betaine type structure. Of these, a 32 percent active solution of the sodium salt of coco amido propyl dimethyl carboxyethyl ammonium chloride in an isopropanol-water solvent is particularly useful.

Examples of useful inorganic laminated particle foam stabilizers are bentonite, talc, asbestos fines, synthetic clays, pulverized vermiculite, graphite and mica. Of these, the most preferred is bentonite because of its low cost and high yield, i.e., high contribution to the consistency of the resulting cement composition. Mixtures of the organic and inorganic foam stabilizers mentioned above also produce good results. Generally, the foam stabilizer or mixture of stabilizers used should be present in the cement composition in an amount in the range of from about 0.25 percent to about 5 percent by weight of dry cement used. When one or more organic surfactant foam stabilizers are used, a concentration in the range of from about 0.25 to 2.5 percent by weight of cement is preferred, and when one or more inorganic particulate lamellar foam stabilizers are used, a concentration in the range of from about 0.25 percent to about 5 percent by weight of cement is preferred. A preferred mixture of inorganic and organic foam stabilizers is 1 percent bentonite, 0.87 percent of a commercially available alkylnaphthalene sodium sulfonate compound and 0.87 percent of dodecyl diphenyl-ether disulfonic acid, all based on the weight of dry cement used.

Dispersing agents can be utilized in the cement composition to facilitate using lower quantities of water and promote higher set cement strength. Also, the use of dispersing agents in the cement composition can prevent premature development of thixotropic properties and promote easier movement of the unset composition. The dispersing agents can be added to the cement composition in an amount up to about 2.0 percent by weight of dry cement. Examples of dispersing agents which have been found to be particularly suitable are commercially available sodium salts of condensed mono-naphthalene sulfonic acids. A method of preparing one such dispersant which includes polyvinylpyrrolidone is decribed in U.S. Pat. No. 3,359,225. Other dispersants which also function as retarders may be used, e.g., lignosulfonates.

Set time modifiers, i.e., set time retarders or accelerators can be added to the cement composition to control the set time in accordance with the particular placement time required. Accelerators such as the soluble inorganic salts can be utilized up to about 10 percent by weight of dry cement; and retarders, either organic or inorganic in nature, can be used up to about 2 percent by weight of dry cement.

Fine aggregate or filler materials, such as fly ash, silica flour, fine sand, diatomaceous and lightweight aggregate fines can be used in the cement composition as long as they do not bring about foam breakout or result in strength reductions. In addition, fibers or whiskers can be used in the lightweight cement composition to provide strength to the composition after it has set. The fibers used can be formed of metal, glass or other synthetic materials which are insoluble in water and which will not deteriorate in alkaline environments when cements other than gypsum cement are used. The fibers must be fine enough not to excessively settle or float in the cement composition and must have a length to diameter ratio low enough to prevent matting or entanglement. Examples of synthetic fibers which are particularly suitable for use in the cement composition are those formed of nylon (polyamides) and polyacylonitrile. The fibers can be up to about 4 inches in length and preferably in the range of from about 0.1 inches to about 4 inches long so long as the length is at least three times the diameter of the largest air pore expected to occur in the cement composition or the largest aggregate which is used in the composition. However, the preferred length of fiber is in the range of from about ⅜ inches to about 1½ inches. The most preferred fibers for use in the cement composition utilized in accordance with the present invention are those formed of nylon having a diameter in the range of from about 0.001 inches to about 0.2 inches and a length in the range of from about ⅜ to 1½ inches. The fibers are preferably present in the cement composition in the range of from about 1/64 pound of fibers per cubic foot of cement slurry to about ⅛ pound of fibers per cubic foot of slurry. The most preferred fiber concentration is in the range of from about 1/16 to about ¼ pound of fibers per cubic foot of cement slurry.

Lightweight cellular sphere type aggregate can be utilized in the lightweight cement composition used in accordance with the present invention. The cellular spheres can be formed of inorganic glass or ceramic material, but must include a high percentage of sealed cells. Sizes passing a 4 mesh sieve (U.S. Sieve Series) and retained on a 100 mesh sieve can be used. The most preferred size of sphere for use in the cement composition is that which passes a 10 mesh sieve and is retained on a 30 mesh sieve. The bulk density of the spheres can range from 15 to 40 pounds per cubic foot with the preferred density being 25 pounds per cubic foot. The bulk volume of spheres used can range from 2 to 5 times the volume of unfoamed cement slurry utilized. When cellular spheres are used in the composition, a foam stabilizer which also functions as a dispersant is preferably used, e.g., an ammonium salt of a sulfonated linear primary ethoxylated alcohol. The foam stabilizer is preferably present in the composition in an amount in the range of from 0.5 percent to about 2.5 percent by weight of dry cement.

Other additives which are known and used by those skilled in the art can be combined with the lightweight cement composition so long as the density of the cement composition remains below about 80 pounds per cubic foot, preferably 50 pounds per cubic foot.

The preferred cellular cement composition for use in accordance with the present invention can be prepared in either a conventional batch or continuous mixing device. Heretofore, cellular cement compositions having densities below about 80 pounds per cubic foot have either required special equipment such as foam generators with special controls and special mixing devices to produce a stable mixture or gas generating chemicals have been mixed with the cement composition to cause foaming thereof. The use of gas generating chemicals generally requires that the composition be quickly placed in final position before a significant amount of gas has been generated. By the present invention, a cellular cement composition is prepared using conventional mixer apparatus to entrain air therein.

Referring to the drawings, and particularly to FIG. 1, the cellular cement composition can be prepared by introducing the water, foam stabilizers and any other water soluble or water dispensible additives used into a mixing tank 10 equipped with a conventional variable speed propeller type mixer 12 and a conventional high speed mixer or homogenizer 14. The mixing tank 10 preferably includes level markers 16, 18 and 20 for indicating predetermined volumes or levels of the various cement composition components before and after foaming, i.e., the marker 16 indicates the level of the water, foam stabilizer and water soluble components before the mixture is foamed, the marker 18 indicates the predetermined volume of the mixture after foaming, and the marker 20 indicates the level of the final composition after addition of the dry cement and other dry materials to the foamed mixture.

After introduction of the water and water soluble components to produce a volume having a level at the marker 16, the low speed mixer 12 is operated to agitate the mixture and introduce air therein. The high speed mixer 14 is simultaneously operated to stabilize the foam and foam a finely foamed mixture. The mixing and introduction of air into the mixture is continued until a volume of foam is produced in the container 10 having a level at the marker 18.

The dry cement utilized and other dry additives such as fibers, aggregates, dispersing agents, set time modifiers, etc., are next introduced into the container 10 and mixed with the foam by the combined action of the high speed mixer 14 (run at a reduced speed) and the low speed prop mixer 12. The mixing is continued until a measure of overall agitation is given to the entire batch of cement composition and the composition attains a level in the container 10 at the marker 20. The density of the cement composition is controlled by foaming the liquid before adding the dry material to a predetermined volume indicated by the marker 18. This volume is determined by considering the absolute volume of the dry materials, the amount of air breakout caused by adding the dry materials to the foam (determined by previous experience) and the desired cement composition density. The final cement composition is a smooth and stable mixture having a desired set time which is withdrawn from the mixing tank 10 by way of a conduit 22 connected thereto and having a shutoff valve 24 disposed therein. A cement placement pump (not shown) is connected to the conduit 22.

Referring now to FIG. 2, an alternate system of apparatus generally designated by the numeral 30 which can be used for preparing the lightweight cement composition is illustrated. The system 30 is comprised of a conventional ribbon blender apparatus 32 having a withdrawal conduit 34 and shutoff valve 36 connected thereto and connected to a cement placement pump (not shown). A container 38 is provided which is connected to a conventional foam generator apparatus 40 by a conduit 42. The foam generator 40 is in turn connected to the ribbon blender 32 by a conduit 44. In use of the system 30 for preparing the lightweight cement composition, two-thirds of the water, the dry cement and the other dry materials used are introduced into the ribbon blender 32 and mixed to form an unfoamed slurry. The remaining one-third of the water is placed in the container 38 along with the foam stabilizers used. The foam generator is operated so that the water and foam stabilizers are withdrawn from the container 38 by way of the conduit 42, foamed with air in the foam generator 40 and the resulting foam then injected into the ribbon blender 32 by way of the conduit 44. Foam injection is continued while operating the ribbon blender 32 until all the water is withdrawn from the container 38 or until a predetermined level of foamed cement composition is produced in the blender 32. The final foamed cement composition is withdrawn from the blender 32 by way of the conduit 34 and valve 36.

When lightweight cellular glass or ceramic spheres are utilized in the cement composition, the composition can be mixed in any conventional low speed mixer which will promote air entrainment. Preferably, the total absolute volume of the cement, water and other additives used (paste phase) is less than the free void space of the bulk volume of lightweight aggregate used. By limiting the volume of paste phase utilized in this manner, a cement mixture results into which air can be entrained with minimum mixing.

In carrying out the method of the present invention for forming a plug in a well bore having liquid standing or flowing therein, a lightweight cement composition having a density substantially equal to or lighter than the liquid in the well bore is prepared in a manner described above. Once the low density cement composition has been prepared, it is introduced into the well bore in a manner such that the cement composition is positioned on or near the surface of the liquid therein. The introduction of the cement composition into the well bore can be accomplished in a variety of ways. For example, a string of tubing can be disposed in the well bore to a position just above the level of liquid therein. The cement composition can then be displaced through the tubing into the well bore so that the cement composition is positioned at or near the surface of the liquid standing therein. Alternatively, a conventional wire line dump bailer or other similar device can be utilized to place the cement composition in the well bore at the desired location therein. Because of the low density of the cement composition, it is buoyed up by the liquid in the well bore and contained in the well bore at a stationary desired location. Further, because the cement composition is buoyed up by the liquid it is not appreciably diluted and the quantity of the lightweight cement composition used is limited so that the pore pressure of the formation or formations penetrated by the well bore is not exceeded. Once the cement composition has been placed at the desired location in the well bore it is allowed to set into a hard impermeable mass thereby forming a plug in the well bore. The exact quantity of cement composition which should be placed on the surface of the liquid contained in the well bore varies in accordance with a variety of factors. Generally, however, the quantity of cement composition is limited to increase the hydrostatic head on the formation as little as possible thereby moving the liquid level in the well bore as little as possible, but which still results in a plug of sufficient strength to contain the formation pressure or to support hydrostatic pressure exerted on the plug during subsequent well treatment or producing operations.

In order to further illustrate the invention and present a clear understanding thereof, the following example is given:

EXAMPLE 1

Various cellular cement compositions are prepared in a system of the type illustrated in FIG. 2 by mixing portland cement, fibers, fillers, dispersing agents and other materials in the ribbon blender 32 with approximately two-thirds of the water used to form a slurry thereof. The remaining one-third of the water is mixed with the foam stabilizers used in the container 38 and air is injected into the foam stabilizer-water mixture by the foam generator 40. The cement slurry and foam are combined in the blender 32 to form the cellular cement composition. After mixing, each of the cellular cement compositions formed are tested for density using a conventional cement density testing apparatus, and portions thereof are placed in molds which are maintained in a 140°F water bath. Upon curing, the set portions of the cellular cement compositions are removed from the molds and tested for compressive strength in a conventional manner. The results of these tests are shown in Table I below.

ited to the specific examples which are given herein for the purpose of disclosure.

What is claimed is:

1. A method of forming a plug in a well bore having liquid standing or flowing therein which comprises the steps of:
    preparing a cement composition having a density substantially equal to or less than the density of the liquid in said well bore;
    introducing the cement composition into the well bore so that the cement composition is floated at or near the surface of the liquid therein; and
    allowing the cement composition to set into a hard impermeable mass in said well bore.

2. The method of claim 1 wherein the liquid standing in said well bore is an aqueous solution.

3. The method of claim 2 wherein the cement composition is a cellular cement composition comprised of hydraulic cement, water present in an amount in the range of from about 23 percent to about 80 percent by weight of dry cement, a foam stabilizer present in an amount in the range of from about 0.25 to 5.0 percent by weight of dry cement and air entrained in said cement composition in an amount sufficient to lower the density thereof to the desired level.

4. The method of claim 3 wherein the hydraulic cement is portland cement.

5. The method of claim 4 wherein the foam stabilizer is selected from the group consisting of organic surfac-

TABLE I

DENSITIES AND COMPRESSIVE STRENGTHS OF VARIOUS CELLULAR CEMENT COMPOSITIONS

| Cement Composition No. | Water Content, % By Weight of Dry Cement | Nylon Fiber Content, Lb/Cubic Foot of Cement Composition | Foaming Agent | Foaming Agent Content, % By Weight of Dry Cement | Density[7] of Composition, Lb/Cubic Foot | 140° F Compressive Strength, psi | |
|---|---|---|---|---|---|---|---|
| | | | | | | After 7 Days | After 14 Days |
| 1 | 60 | 1/12 | A[1] | 1.0 | 51.1 | 509 | — |
| 3 | 60 | 1/12 | A[1] | 1.5 | 47.7 | 353 | — |
| 4 | 60 | 1/12 | A[1] | 2.0 | 51.8 | 242 | — |
| 10 | 60 | 1/6 | −[ A[1] / B[2] ]− | 0.5 / 0.5 | 50.3 | 448 | — |
| 11 | 40 | 1/4 | −[ A[1] / B[2] ]− | 0.5 / 0.5 | 50.2 | 482[4] | — |
| 12 | 40 | 1/3 | −[ A[1] / B[2] ]− | 0.5 / 0.5 | 51.6 | 379 | — |
| 14 | 60 | 0[3] | −[ A[1] / B[2] ]− | 0.13 / 0.25 | 47.2 | 231[5] | — |
| 15 | 50 | 1/12 | −[ A[1] / B[2] ]− | 0.5 / 0.25 | 50.7 | 505 | 551 |
| 16 | 50 | 0 | −[ A[1] / B[2] ]− | 0.5 / 0.5 | 49.8 | 534 | 502 |
| 17 | 70 | 1/12 | −[ A[1] / B[2] ]− | 0.5 / 0.25 | 51.5 | 334 | — |
| 20[6] | | | | | | | |
| 22[6] | | | | | | | |

[1]Foaming agent A is an alkylnaphthalene sodium sulfonate compound sold commercially under the trade designation "PETRO AG" by the Petro Chemical Company.
[2]Foaming agent B is a dodecyl diphenyl-ether disulfonic acid sold commercially under the trade designation "DOWFAX 2AO" by the Dow Chemical Corporation.
[3]Includes 25% by weight of dry cement of a fine expanded lightweight filler in lieu of fibers.
[4]After 4 days instead of 7 days.
[5]After 3 days instead of 7 days.
[6]Includes 40% by weight of dry cement of a pozzolanic material.
[7]Moist cured density.

From the foregoing, it can be seen that lightweight cellular cement compositions can be prepared and used in accordance with the present invention having sufficient compressive strengths for plugging low pressure water wells and the like.

It will be understood by those skilled in the art that considerable variations in the relative amounts of the different components of cement compositions and the use of such compositions for forming plugs in well bores can be made and the invention is not to be limtant foam stabilizers, inorganic particulate lamellar foam stabilizers and mixtures thereof.

6. The method of claim 5 wherein the cement composition is further characterized to include fibers having a length in the range of from about ⅜ inches to about 1½ inches, said fibers being present in said cement composition in an amount in the range of from about 1/64 to about ¾ of a pound of fibers per cubic foot of composition.

7. The method of claim 6 wherein the step of preparing the lightweight cement composition includes:
mixing the foam stabilizer with the water;
introducing air into the foam stabilizer-water mixture to form a predetermined volume of foam; and
combining the hydraulic cement and fibers with the foam to form said cement composition.

8. The method of claim 3 wherein the foam stabilizer is comprised of one or more organic surfactant foam stabilizers present in an amount in the range of from about 0.25 percent to about 2.5 percent by weight of dry cement.

9. The method of claim 3 wherein the foam stabilizer is comprised of one or more inorganic particulate lamellar foam stabilizers present in an amount in the range of from about 0.25 percent to about 5 percent by weight of dry cement.

10. The method of claim 2 wherein the cement composition is a cellular cement composition comprised of hydraulic cement, water present in the range of from about 23 percent to about 80 percent by weight of dry cement, a foam stabilizer present in an amount in the range of from about 0.5 percent to about 2.5 percent by weight of dry cement, lightweight cellular sphere aggregate present in a volume in the range of from about 2 to about 5 times the volume of unfoamed cement, water and foam stabilizer used, and air entrained in said cement composition in an amount sufficient to lower the density thereof to the desired level.

11. The method of claim 10 wherein the step of preparing the lightweight cement composition includes:
mixing the cement and foam stabilizer with the water;

combining the lightweight cellular sphere aggregate with the resultant cement-foam stabilizer-water mixture in an amount such that the volume of the cement-foam stabilizer-water mixture is less than the free void space of the aggregate; and
introducing air into the resultant cement composition.

12. A method of forming a plug in a well bore traversing one or more liquid producing formations having high effective permeabilities and low pressures comprising the steps of:
preparing a lightweight cement composition having a density such that the cement composition is buoyant in the liquid produced by said formations;
introducing the cement composition into said well bore so that the cement composition is floated at or near the surface of the formation liquid contained therein; and
allowing the cement composition to set into a hard impermeable mass thereby forming a plug in said well bore.

13. The method of claim 12 wherein the liquid produced by said formation is an aqueous solution.

14. The method of claim 13 wherein the cement composition is a cellular cement composition comprised of hydraulic cement, water present in an amount in the range of from about 23 percent to about 80 percent by weight of dry cement, a foam stabilizer present in an amount in the range of from about 0.25 to 5.0 percent by weight of dry cement and air entrained in said cement composition in an amount sufficient to lower the density thereof to the desired level.

15. The method of claim 14 wherein the hydraulic cement is portland cement.

16. The method of claim 15 wherein the foam stabilizer is selected from the group consisting of organic surfactant foam stabilizers, inorganic particulate lamellar foam stabilizers and mixtures thereof.

17. The method of claim 16 wherein the cement composition is further characterized to include fibers having a length in the range of from about ⅜ inches to about 1½ inches, said fibers being present in said cement composition in an amount in the range of from about 1/64 to about ¾ of a pound of fibers per cubic foot of composition.

18. A method of claim 17 wherein the step of preparing the lightweight cement composition includes:
mixing the foam stabilizer with the water;
introducing air into the foam stabilizer-water mixture to form a predetermined volume of foam; and
combining the hydraulic cement and fibers with the foam to form said cement composition.

19. The method of claim 14 wherein the foam stabilizer is comprised of one or more organic surfactant foam stabilizers present in an amount in the range of from about 0.25 percent to about 2.5 percent by weight of dry cement.

20. The method of claim 14 wherein the foam stabilizer is comprised of one or more inorganic particulate lamellar foam stabilizers present in an amount in the range of from about 0.25 percent to about 5 percent by weight of dry cement.

21. The method of claim 13 wherein the cement composition is a cellular cement composition comprised of hydraulic cement, water present in the range of from about 23 percent to about 80 percent by weight of dry cement, a foam stabilizer present in an amount in the range of from about 0.5 percent to about 2.5 percent by weight of dry cement, lightweight cellular sphere aggregate present in a volume in the range of from about 2 to about 5 times the volume of unfoamed cement, water and foam stabilizer used, and air entrained in said cement composition in an amount sufficient to lower the density thereof to the desired level.

22. The method of claim 21 wherein the step of preparing the lightweight cement composition includes:
mixing the cement and foam stabilizer with the water;

combining the lightweight cellular sphere aggregate with the resultant cement-foam stabilizer-water mixture in an amount such that the volume of the cement-foam stabilizer-water mixture is less than the free void space of the aggregate; and
introducing air into the resultant cement composition.

\* \* \* \* \*

UNITED STATES PATENT OFFICE
CERTIFICATE OF CORRECTION

Patent No. 3,844,351          Dated October 29, 1974

Inventor(s) David L. Sutton; Lloyd G. Carter

It is certified that error appears in the above-identified patent and that said Letters Patent are hereby corrected as shown below:

Column 4, line 33, delete "1/8" and insert --3/4--.

Column 5, line 33, delete "foam" (second occurrence) and insert --form--.

Signed and sealed this 14th day of January 1975.

(SEAL)
Attest:

McCOY M. GIBSON JR.
Attesting Officer

C. MARSHALL DANN
Commissioner of Patents